J. MENCHEN AND A. G. BERGMAN.
NUT LOCK.
APPLICATION FILED AUG. 14, 1920.
1,394,778.
Patented Oct. 25, 1921.
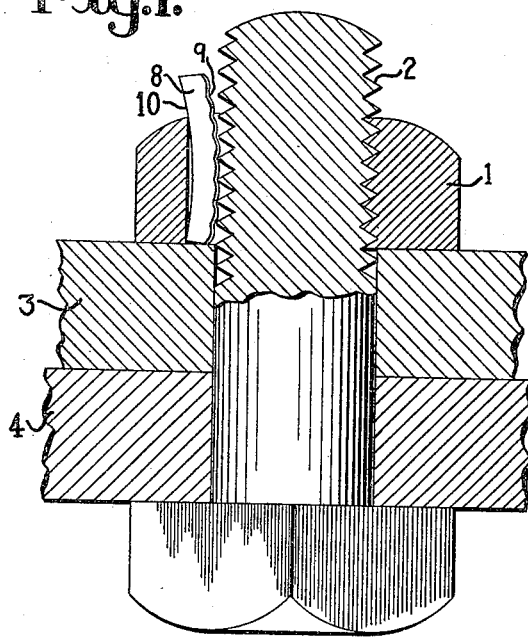
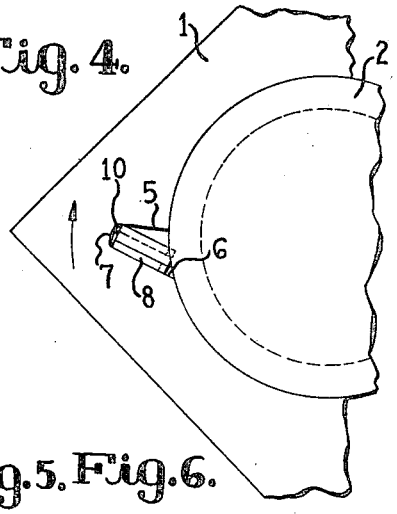
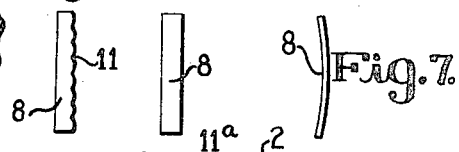
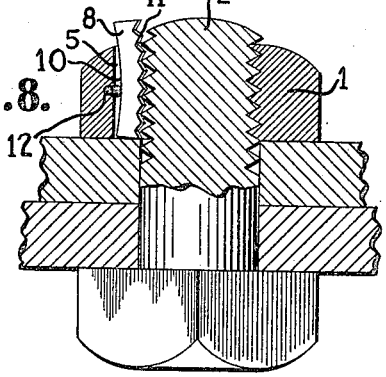
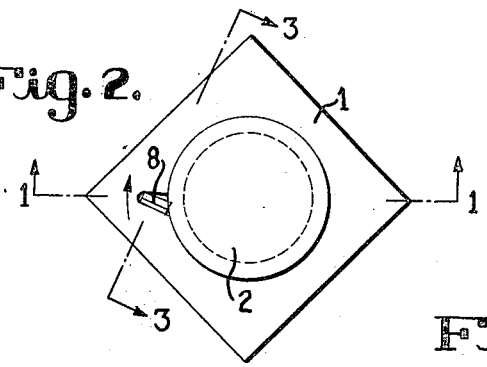
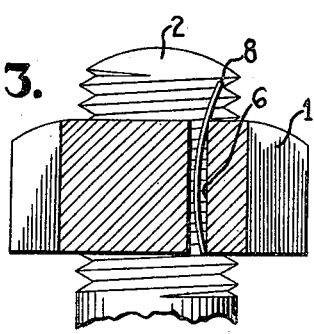
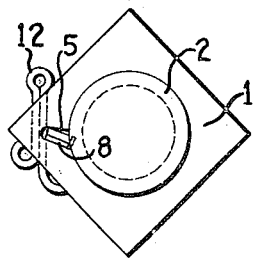
INVENTORS
Joseph Menchen and
Axel G. Bergman
BY
ATTORNEY

UNITED STATES PATENT OFFICE.

JOSEPH MENCHEN AND AXEL G. BERGMAN, OF NEW YORK, N. Y., ASSIGNORS, BY DIRECT AND MESNE ASSIGNMENTS, TO THOMAS GORDON HOAGLAND, OF ROCK-AWAY, NEW JERSEY.

NUT-LOCK.

1,394,778.          Specification of Letters Patent.      Patented Oct. 25, 1921.

Application filed August 14, 1920. Serial No. 403,470.

*To all whom it may concern:*

Be it known that we, JOSEPH MENCHEN, a citizen of the United States, and AXEL G. BERGMAN, a subject of the King of Sweden, both residing in the borough of Manhattan, in the city, county, and State of New York, have invented a new and useful Nut-Lock, of which the following is a specification.

The object of the invention is to provide a simple, inexpensive and effective nut-lock. The locking is secured by a bowed or bent spring strip in a longitudinal notch in the bolt-hole of the nut, the construction being such that a simple strip acts transversely to itself as a tilting strut between the threads of the bolt and the back or apex of the notch to positively prevent relative movement in one direction, while permitting free movement in the opposite direction, and holds itself by its spring constantly in position to perform such locking function. The construction also enables the strip to be formed for a certain degree of interengagement with the threads of the bolt, so as to keep it from working out of the notch, while permitting it to be withdrawn by an endwise pull.

In the accompanying drawings forming a part hereof:

Figure 1 is a section in an axial plane (see the line 1—1 of Fig. 2) through a nut and bolt locked together by the strip, which is seen in perspective mainly in front of the plane of the section, the bolt being shown partly in elevation, and a base being represented by two parts between the nut and the head of the bolt;

Fig. 2 is a plan view of the nut and bolt, with the lock;

Fig. 3 is a section through the nut and lock strip on the line 3—3 of Fig. 2;

Fig. 4 is a fragmentary plan view, being an enlargement of Fig. 2;

Fig. 5 is a face view of the lock strip;

Fig. 6 is a face view of a lock strip having a plain edge;

Fig. 7 is an edge view showing a curvature suitable for either form;

Fig. 8 is a view similar to Fig. 1, on a smaller scale, showing a modification; and Fig. 9 is a plan view of this form.

The nut is designated 1, the bolt 2, and members of a base, 3 and 4.

The nut has a longitudinal notch 5 in the side of its threaded bolt-hole, generally V-shaped in cross section, and having its rear wall 6 inclined rearwardly of the radius, from the back or apex 7 of the notch to the bolt-hole. The terms "rear" and "rearwardly" are used for convenience, with reference to the rotation of the nut in the screwing-on direction represented by the curved arrow in Figs. 2 and 4. Of course the lock can be arranged to act in either direction.

The locking member is a flat strip or elongated piece 8 of spring metal, initially curved or bent in its length, the bending being preferably a simple bowing as shown. This strip lies in the notch against the side wall 6, and between the contracted bottom 7 of the notch and the side of the bolt, with its working edge 9 in rear of the radius of the circle of the bolt drawn to its rear or fulcrum edge 10. Canted edgewise to the bolt in this manner, the strip does not obstruct relative turning movement in the direction of the arrow, but turning in the opposite or unscrewing direction is impossible, because the friction of the bolt on the edge of the strip tends to tilt it so that it jams against the bolt and the bottom of the recess.

The deflection of the bowing or bending of the strip is perpendicular to the side wall 6, that is to say generally transverse or tangential rather than radial to the bolt. Owing to this bending, the strip bears resiliently with one face at one or more regions against the wall 6 and, with one edge at one or more other regions against the bolt, so that the strip is always in contact with the bolt and therefore ready at all times to resist undesired rotation, or in other words, the bending of the strip causes it to fill its pocket so that it cannot lie away from the bolt. Furthermore, the locking member is self-accommodating to its quarters, so that the proportions do not have to be exact. The resilient pressure of the strip-form locking member against the side of the notch and the edge of the bolt is at three or more regions altogether, the strip acting in this sense as a resilient arch. As illustrated, the depth of the notch can be sufficiently greater than the width of the strip to allow the latter to be provided with corrugations or indentations 11 to catch the threads of the bolt, in order to guard against the strip jarring out of the pocket; yet by pulling on the end of the strip with a pair of pliers, the strip will be straightened sufficiently so that its edge projections or recesses escape the threads, enabling the strip to be withdrawn.

Figs. 8 and 9 illustrate a construction with deeper retaining formations 11ª on the working edge of the strip. In this case the pocket also must be deeper to permit the strip to be taken out; and a cotter pin 12, in a transverse opening in the nut intersecting the back of the recess, may be used to reduce the depth of the pocket while the lock is discharging its duty, the edge 10 of the strip fulcruming on this pin. To remove the strip, in this case, the cotter pin is first taken out, thereby affording clearance for the teeth of the strip to pass the threads of the bolt.

Plain edge strips may also be used, as indicated in Fig. 6.

In the drawings the bowed strip is shown with its two end portions bearing upon the wall 6, and the middle portion of its working edge against the bolt; but this might be reversed. Other changes in form, proportions and arrangements will suggest themselves.

What we claim as new is:

1. A nut-lock comprising a nut having a longitudinal notch in the side of its threaded bolt-opening, and a locking device of resilient strip material substantially loose in said notch canted edgewise to the bolt and prebent to bear against one side of the notch and the threads of the bolt, and acting bodily transversely to itself as a tilting strut between the threads of the bolt and the back or apex of the notch to block relative turning movement in one direction.

2. The combination with a bolt and a nut having a simple longitudinal notch in the side of its threaded bolt-opening, of a locking device consisting simply of a longitudinally bowed or bent flat spring strip lying in the notch canted edgewise to the bolt and acting bodily transversely to itself as a tilting strut between the threads of the bolt and the back or apex of the notch, so as to block relative turning movement in one direction, the locking device maintaining itself in active position by pressing resiliently at three or more regions against the side of the notch and the periphery of the bolt.

3. A nut lock comprising the combination with a bolt and a nut, the latter provided with a substantially V-shaped notch in the side of its threaded bolt opening, of a bowed flat spring strip in the notch canted edgewise to the bolt and pressing resiliently against the side of the slot and the periphery of the bolt, with the two ends of its arch against one and the middle against the other, to act as a tilting strut between the threads of the bolt and the back or apex of the notch.

4. A nut-lock comprising, in combination with a bolt, and a nut having a longitudinal notch in its threaded bolt opening, a bowed or bent spring strip in the notch canted edgewise to the bolt, and having its working edge formed to catch with the threads of the bolt, the relations being such that the strip is withdrawable by a pull which straightens it sufficiently to release the interengagement, substantially as set forth.

JOSEPH MENCHEN.
AXEL G. BERGMAN.